United States Patent
Morita

(10) Patent No.: US 9,900,462 B2
(45) Date of Patent: Feb. 20, 2018

(54) FILE TRANSMISSION APPARATUS, CONTROL METHOD OF FILE TRANSMISSION APPARATUS, AND STORAGE MEDIUM

(71) Applicant: CANON KABUSHIKI KAISHA, Tokyo (JP)

(72) Inventor: Hiroyasu Morita, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/232,453

(22) Filed: Aug. 9, 2016

(65) Prior Publication Data

US 2017/0064131 A1  Mar. 2, 2017

(30) Foreign Application Priority Data

Aug. 27, 2015 (JP) .................................. 2015-168295

(51) Int. Cl.
*H04N 1/32* (2006.01)
*G06F 17/30* (2006.01)
*H04N 1/00* (2006.01)

(52) U.S. Cl.
CPC ..... *H04N 1/32128* (2013.01); *G06F 17/3012* (2013.01); *G06F 17/30115* (2013.01); *H04N 1/00204* (2013.01); *H04N 1/00244* (2013.01); *H04N 1/00482* (2013.01); *H04N 2201/0039* (2013.01); *H04N 2201/0094* (2013.01)

(58) Field of Classification Search
CPC ........... H04N 1/32128; H04N 1/00204; H04N 1/00244; H04N 1/00482
USPC ....................................... 358/1.15, 1.14, 1.9
See application file for complete search history.

(56) References Cited

U.S. PATENT DOCUMENTS

2014/0122479 A1* 5/2014 Panferov ............ G06K 9/00469
707/736
2016/0308950 A1* 10/2016 Bouvrette .............. G06Q 10/06

FOREIGN PATENT DOCUMENTS

JP        2002-207621 A        7/2002

\* cited by examiner

*Primary Examiner* — Houshang Safaipour
(74) *Attorney, Agent, or Firm* — Canon USA, Inc. I.P. Division

(57) ABSTRACT

A specification of whether to overwrite a file having a same file name can be received based on a selection of whether to add additional information to a file name.

17 Claims, 13 Drawing Sheets

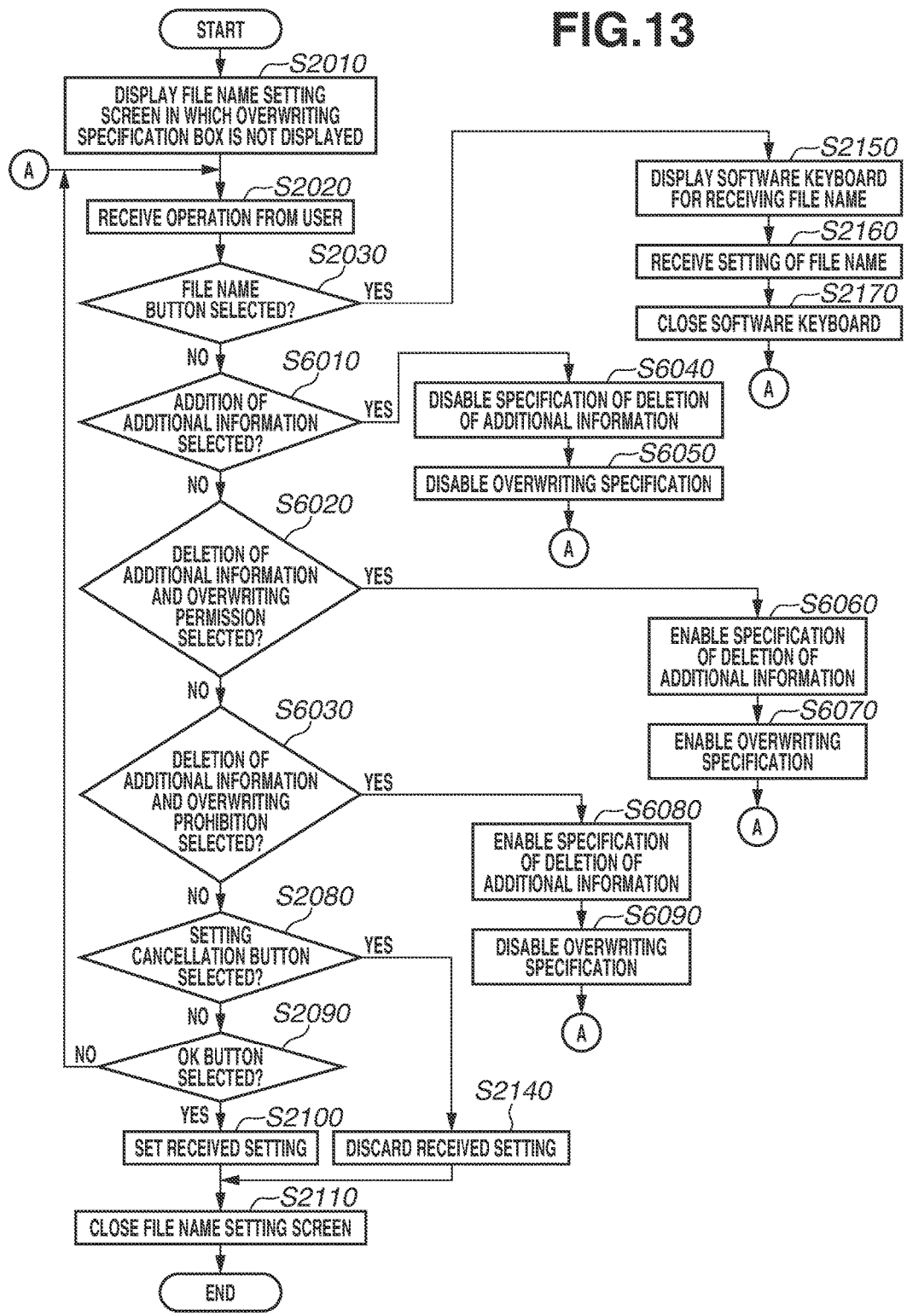

FILE TRANSMISSION APPARATUS, CONTROL METHOD OF FILE TRANSMISSION APPARATUS, AND STORAGE MEDIUM

BACKGROUND OF THE INVENTION

Field of the Invention

The present disclosure relates to a file transmission apparatus, a control method of the file transmission apparatus, and a storage medium.

Description of the Related Art

Conventionally, there are file transmission apparatuses which read documents, convert image data of the read documents into files, and transmit the converted files according to file transmission protocols such as server message block (SMB) and a file transfer protocol (FTP).

The file transmission apparatuses set file names to files to be transmitted and transmit the files to which the file names are set.

When files having the same file names have been already stored in file transmission destinations, the stored files are overwritten with the files transmitted later.

In order to prevent a file from being overwritten unintentionally, there is a technique for adding a serial number and/or a transmission date and time of the file to the end of a file name (see Japanese Patent Application Laid-Open No. 2002-207621).

Depending on a purpose of use by a user, the user may not want to add additional information such as a serial number and a date to a file name in some cases.

For example, when a file stored in a file transmission destination is desired to be managed by being always updated to the latest one, the file already stored in the file transmission destination is to be overwritten with a file stored later.

Thus, a method can be considered which causes a user to specify whether to automatically add additional information to a file name of a file to be transmitted.

In the case in which the additional information is not added, when a file having the same file name as a file previously stored in the file transmission destination is transmitted later, it is highly likely that the file previously stored is overwritten with the file transmitted later. Thus, it is desirable that a user can specify not to overwrite the file having the same file name.

On the other hand, in the case in which the additional information is added, a file name of a file transmitted later is different from a file name of a file previously transmitted, and it is unlikely that the file previously stored in the file transmission destination is overwritten with the file transmitted later. If a user is caused to specify whether to overwrite the file having the same file name in such a case, the specification by the user will be wasted.

SUMMARY OF THE INVENTION

A file transmission apparatus according to the present disclosure includes a selection unit configured to select whether to assign a file name including additional information to the file or a file name not including additional information to the file, a setting unit configured to set a file name to the file based on a selection by the selection unit, a transmission unit configured to transmit the file to which the file name is set by the setting unit, a reception unit configured to receive from a user specification of whether to overwrite a file stored in a transmission destination of the file with a file having a same file name as the relevant file, and a control unit configured to enable reception by the reception unit based on the selection by the selection unit.

According to other aspects of the present disclosure, one or more additional file transmission apparatuses, one or more control methods for use with same and one or more storage mediums are discussed herein. Further features of the present disclosure will become apparent from the following description of exemplary embodiments with reference to the attached drawings.

BRIEF DESCRIPTION OF THE DRAWINGS

FIG. 13 is a flowchart illustrating operations of the MFP according to the exemplary embodiment of the present disclosure.

DESCRIPTION OF THE EMBODIMENTS

Various exemplary embodiments according to the present disclosure will be described below with reference to the attached drawings.

Figure 1:
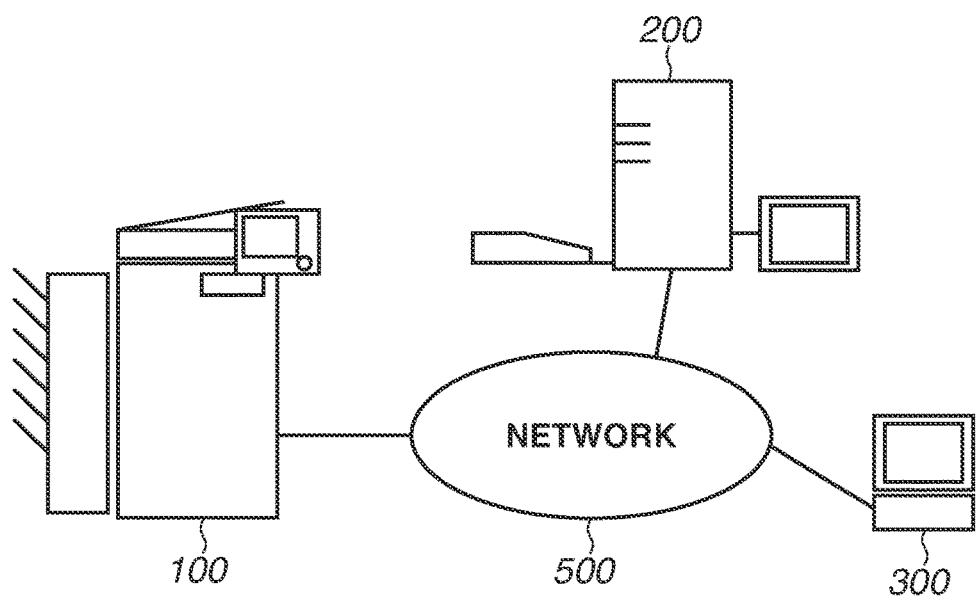
FIG. 1 is a block diagram illustrating a system configuration according to an exemplary embodiment of the present disclosure.

FIG. 1 is a block diagram illustrating a configuration of a system according to a first exemplary embodiment.

The system according to the present exemplary embodiment includes an MFP 100 as an example of a file transmission apparatus, a server 200, and a personal computer (PC) 300. The MFP 100, the server 200, and the PC 300 are connected with each other by a network 500. The MFP 100, the server 200, and the PC 300 connected to the network 500 is not limited to one, and a plurality of respective devices may be connected thereto. The network 500 may be a wired or a wireless network.

The MFP 100 communicates with the server 200 and the PC 300 via the network 500.

Figure 2:
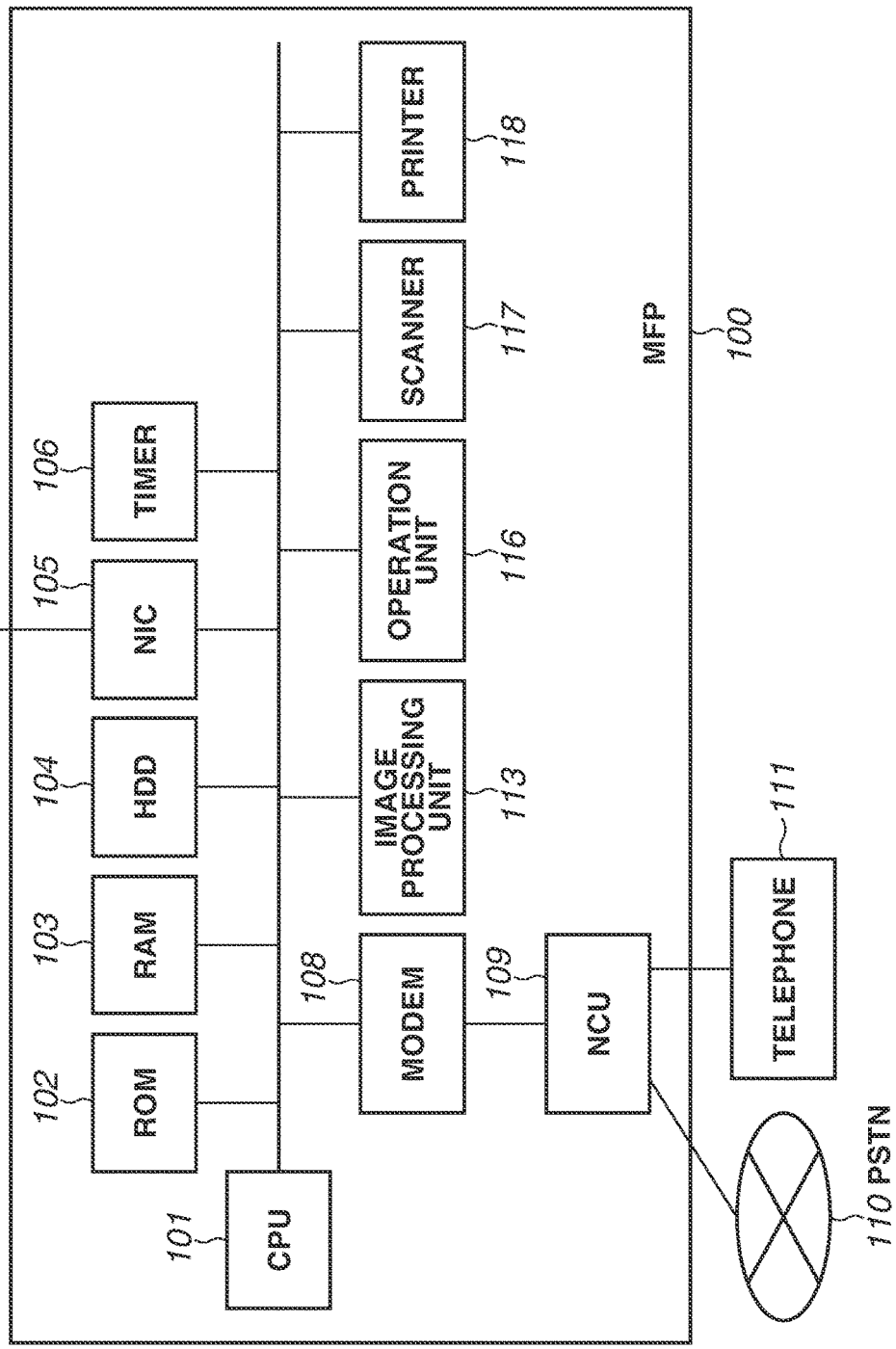
FIG. 2 is a block diagram illustrating a configuration of a multifunction peripheral (MFP) according to the exemplary embodiment of the present disclosure.

FIG. 2 is a block diagram illustrating a configuration of the MFP 100 according to the present exemplary embodiment.

The MFP 100 according to the present exemplary embodiment includes a central processing unit (CPU) 101, a read-only memory (ROM) 102, a random access memory (RAM) 103, and a hard disk drive (HDD) 104. The MFP 100 further includes a network interface card (NIC) 105, a timer 106, a modulator-demodulator (modem) 108, a network control unit (NCU) 109, an image processing unit 113, an operation unit 116, a scanner 117, and a printer 118.

The CPU 101 comprehensively controls the MFP 100 by reading a program stored in the ROM 102 or the HDD 104 to the RAM 103 and executing the program therein.

The ROM 102 stores a program read and executed by the CPU 101.

The RAM 103 functions as a work area of the CPU 101. The RAM 103 stores data and a program read by the CPU 101.

The HDD 104 is a high-capacity nonvolatile memory for storing a program and image data. A Blu-ray Disc and a solid state drive (SSD) may be used in place of the HDD 104.

The NIC 105 controls network communication performed by the MFP 100 via a local area network (LAN) 112. The MFP 100 performs network communication with external PC and MFP via the NIC 105 and the LAN 112.

The modem 108 modulates and demodulates a signal subjected to facsimile communication. The modem 108 modulates data transmitted by the facsimile from the MFP 100 to public switched telephone networks (PSTN) 110. Further, the modem 108 demodulates data received by the facsimile from the PSTN 110 to the MFP 100.

The NCU 109 is connected to the PSTN 110 and exchanges information with an exchanger installed in a telephone exchange and the like using a predetermined procedure. For example, the NCU 109 transmits and receives a dial signal so that the MFP 100 performs communication via the PSTN 110.

The PSTN 110 is a public telephone line network.

A telephone 111 is externally installed in the MFP 100 and includes a handset used for a phone call and an answering machine function.

The image processing unit 113 executes rotation processing and monochromatic/color conversion processing of image data.

The operation unit 116 is constituted of hard keys and a display unit including a touch panel. The operation unit 116 displays an operation screen and a status of the MFP 100 on the display unit. Further, the operation unit 116 receives an operation from a user via the hard keys or the touch panel.

The scanner 117 reads an image of a document placed on a document platen and generates image data representing the image of the read document. The scanner 117 may include an auto document feeder (ADF) which conveys a plurality of sheets in documents one by one. When the ADF is used, the scanner 117 reads a document conveyed by the ADF and generates image data representing the image of the document. The generated image data is stored in the HDD 104.

Figure 3:
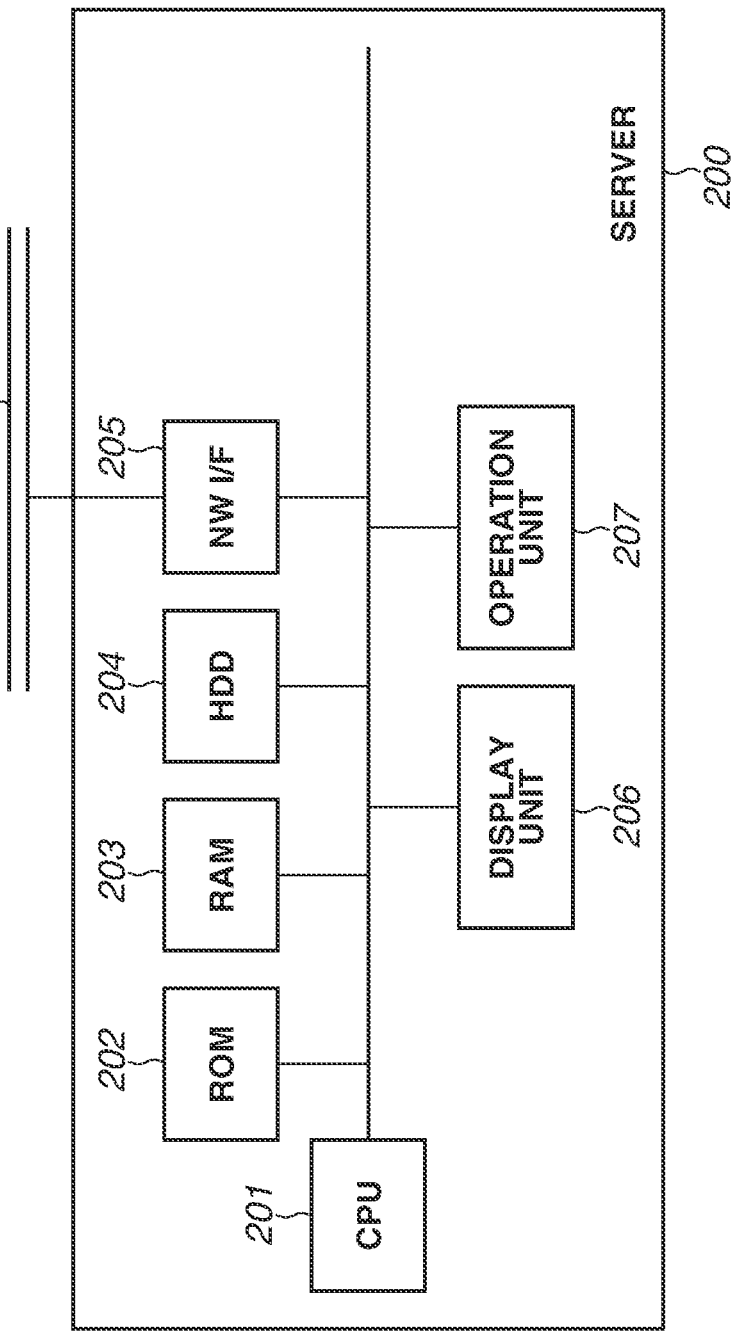
FIG. 3 is a block diagram illustrating a configuration of a server according to the exemplary embodiment of the present disclosure.

The printer 118 feeds a sheet and prints an image on the fed sheet. Image printing is performed based on image data of a document read by the scanner 117, image data received via the PSTN 110, or image data received from the network 500. FIG. 3 is a block diagram illustrating a configuration of the server 200 according to the present exemplary embodiment.

The server 200 according to the present exemplary embodiment includes a CPU 201, a ROM 202, a RAM 203, and a HDD 204. The server 200 further includes a network interface (NW I/F) 205, a display unit 206, and an operation unit 207.

The CPU 201 comprehensively controls the server 200 by reading a program stored in the ROM 202 or the HDD 204 to the RAM 203 and executing the program therein.

The ROM 202 stores a program read and executed by the CPU 201.

The RAM 203 functions as a work area of the CPU 201. The RAM 203 stores data and a program read by the CPU 201.

The HDD 204 is a high-capacity nonvolatile memory for storing a program and image data. A Blu-ray Disc and a solid state drive (SSD) may be used in place of the HDD 204.

The NW I/F 205 controls network communication performed by the server 200 via the network 500.

The display unit 206 displays an operation screen and a file stored in the HDD 204.

The operation unit 207 is constituted of a mouse and a keyboard and receives an operation from a user.

A configuration of the PC 300 is similar to the configuration of the server 200, and detail description thereof is omitted.

Figure 4:
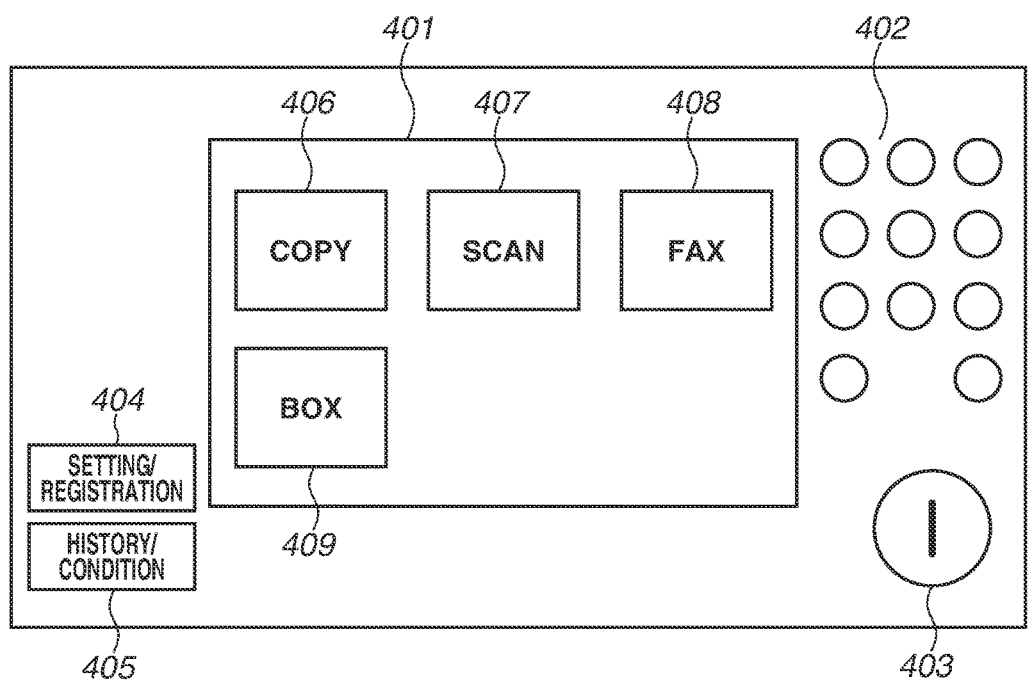
FIG. 4 illustrates a configuration of an operation unit according to the exemplary embodiment of the present disclosure.

FIG. 4 illustrates a screen on the operation unit 116 of the MFP 100.

As described with reference to FIG. 2, the operation unit 116 includes a display unit 401 provided with a touch panel and hard keys 402.

On the display unit 401, a function selection screen is displayed on which a user selects a function to use. On the function selection screen, a plurality of buttons is displayed for calling operation screens of a copy function, a scanning function, a facsimile function, and a box function.

A "copy" button 406 is a button for calling the operation screen of the copy function. The copy function is a function of reading an image of a document by the scanner 117 and printing the read image of the document on a sheet by the printer 118.

A "scan" button 407 is a button for calling the operation screen of the scanning function. The scanning function is a function of reading an image of a document by the scanner 117 and transmitting image data representing the read image of the document to an external apparatus such as the server 200 and the PC 300 via the network 500.

A "fax" button 408 is a button for calling the operation screen of the facsimile function. The facsimile function is a function of reading an image of a document by the scanner 117 and transmitting the image data representing the read image of the document by the facsimile via the PSTN 110.

A "box" button 409 is a button for calling the operation screen of the box function. The box function is a function of reading an image of a document by the scanner 117 and storing the image data representing the read image of the document in the HDD 104.

In addition to these functions, the MFP 100 may have a function of printing the image data stored in the HDD 104 by the box function and a function of transmitting the image data stored in the HDD 104 by the box function via the network 500 or the PSTN 110.

Further, the operation unit 116 includes a start key 403 for instructing a start of copying and scanning, a "setting/registration" screen call button 404 for calling a device setting screen, and a "history/condition" button 405 for calling a screen of history and condition of a job.

Figure 5:
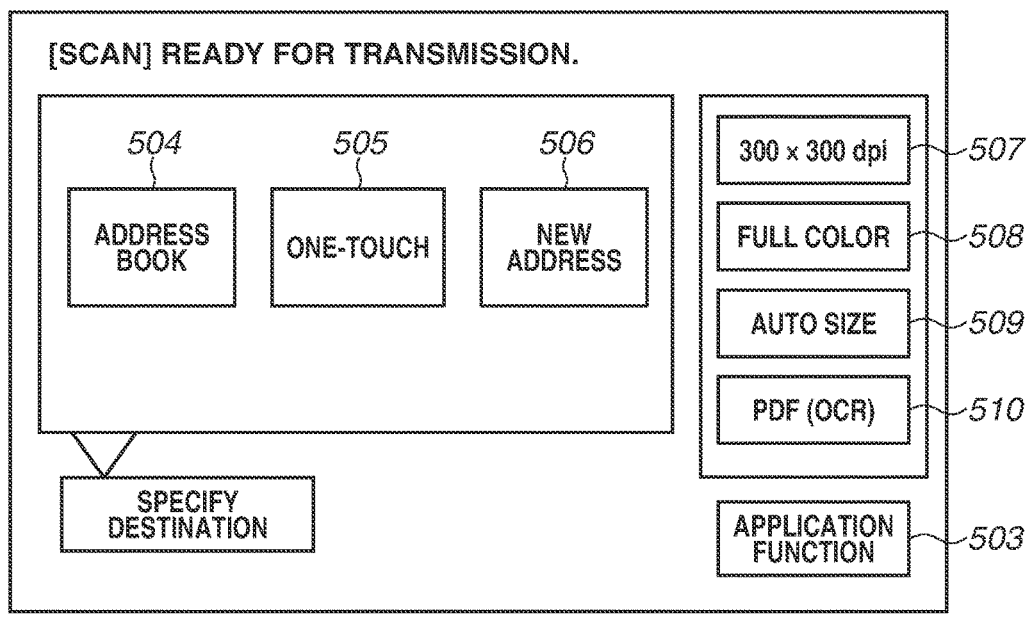
FIG. 5 illustrates a configuration of the operation unit according to the exemplary embodiment of the present disclosure.

FIG. 5 illustrates an example of the operation screen of the scanning function displayed on the operation unit 116 when a user selects the "scan" button 407.

On the operation screen of the scanning function, an address book button 504, a one-touch button 505, and a new address button 506 are displayed.

The address book button 504 is a button for reading and displaying an address book preliminarily stored in the HDD 104 on the display unit 402. The address book can store a plurality of addresses therein, and a user selects a desired address from the addresses included in the displayed address book. When an address is selected by the user, the CPU 101 stores the selected address in the HDD 104 as a data transmission destination.

The one-touch button 505 is a button for setting the address preliminarily registered in the HDD 104 as the data transmission destination in association with the one-touch button 505. When the one-touch button 505 is selected by a user, the CPU 101 stores, in the HDD 104, the address preliminarily registered as the data transmission destination in association with the one-touch button 505.

The new address button is a button for causing the display unit 401 to display a software keyboard not illustrated for inputting a new address. When an input of the new address is received from a user via the software keyboard, the CPU 101 stores the input address as the data transmission destination in the HDD 104.

A resolution setting button 507 is a button for setting resolution of image data generated by the scanner 117 reading a document. For example, when the resolution setting button 507 is pressed, a plurality of selection candidates such as 200 dpi*200 dpi, 300 dpi*300 dpi, and 600 dpi*600 dpi are displayed. When a user selects any of the options, the CPU 101 sets the selected resolution as resolution of the image data generated by the scanner 117 reading the document.

A color button 508 is a button for setting whether to read a document in color or monochrome when the scanner 117 reads the document.

A reading size setting button 509 is a button for setting a size of a document read by the scanner 117.

A file format setting button 510 is a button for setting a file format of a file to be transmitted. The CPU 101 performs control to convert image data of a document read by the scanner 117 into a file in the file format set by the file format setting button and transmits the file. As a settable file format, a Tagged Image File Format (TIFF) and a Portable Document Format (PDF) are included.

An application function button 503 is a button for calling various advanced settings regarding file transmission.

The advanced settings include a file name setting and a timer setting for transmitting a file at a specified time.

Figure 6A:
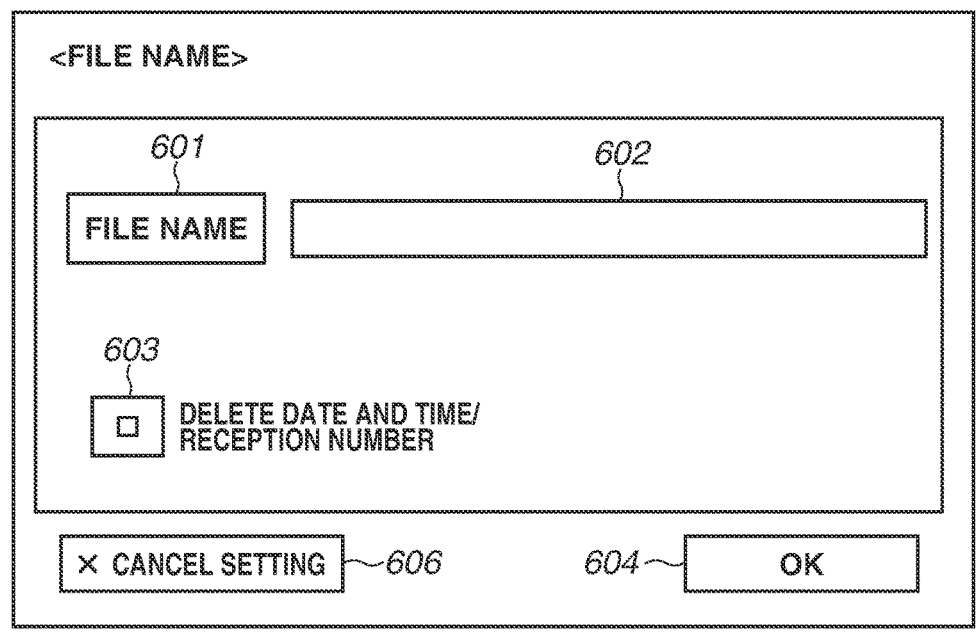
FIGS. 6A and 6B illustrate operation screens displayed on the operation unit according to the exemplary embodiment of the present disclosure.

FIG. 6A illustrates a file name setting screen which is displayed on the operation unit 116 when a user touches the "application function" button 503 and specifies a file name setting function.

A "file name" button 601 is a button for displaying a software keyboard for receiving a file name to be set to a file from a user. When the "file name" button 601 is pressed, the software keyboard is displayed. The user sets a file name using the software keyboard. The set file name is stored in the HDD 104 by the CPU 101. Further, the set file name is displayed in a file name display field 602.

A deletion specification box 603 is a check box for setting whether to automatically add additional information such as date and time and a receipt number to a file name. When the deletion specification box 603 is unchecked, the additional information is automatically added to the file name. On the other hand, when the deletion specification box 603 is checked, the additional information is not added to the file name. Every time a user touches the deletion specification box 603, a setting for adding the additional information to the file name and a setting for not adding the additional information to the file name is switched. Which setting is enabled is stored in the HDD 104 and managed by the CPU 101.

The date and time is information indicating a file transmission time obtained from the timer 106. For example, a user sets a character string "transmission document" as the file name, sets PDF as a file format, and unchecks the deletion specification box 603. Subsequently, when the user transmits the file at 11:25 and 32 seconds on Sep. 1, 2015, the CPU 101 obtains a value "20150901112532" from the timer 106 when the file is transmitted. The CPU 101 adds the obtained value after the character string "transmission document" with an underscore inserted therebetween. Further, the CPU 101 adds an extension indicating the specified file format to the end of the file name. The file name in this case will be "transmission document_20150901112532.pdf". Then, the CPU 101 transmits the file to which the file name is set to a specified address. On the other hand, it is assumed that a user sets a "transmission document" as the file name, sets PDF as the file format, and performs transmission at the same time with a state that the deletion specification box 603 is checked. In this case, the CPU 101 adds the extension indicating the specified file format after the character string "transmission document". The file name in this case will be "transmission document.pdf". Then, the CPU 101 transmits the file to which the file name is set to the specified address.

Here, a value combining year, month, day, hour, minute, and second is described as an example of the date and time, the date and time may be a value which can sufficiently avoid duplication of the file name. For example, the date and time may not include a year or may include a time scale of one tenth or one hundredth of a second.

On the other hand, the receipt number is a serial number which is started from one and incremented by one every time the file transmission is performed. When the first file transmission is performed by the MFP 100, "00000001" is added as the file name, and "00000002" is added as the file name at the time of the second file transmission. A value indicating how many times the transmission is performed is stored in the HDD 104 and incremented by the CPU 101. The number of digits of the receipt number may be the number of digits sufficient for avoiding duplication of the file name (for example, eight digits or more).

Whether to add the date or the receipt number as the additional information may be selected by a user in advance. According to the present exemplary embodiment, a case is described in which the date and time is used as the additional information. Whether to add the date or the receipt number as the additional information may be determined by a transmission protocol used when the file is transmitted. For example, when a file is transmitted by an electronic mail, the receipt number may be used as the additional information, and when a file is transmitted by a Server Message Block (SMB) and a file transfer protocol (FTP), the date may be used as the additional information.

Figure 6B:
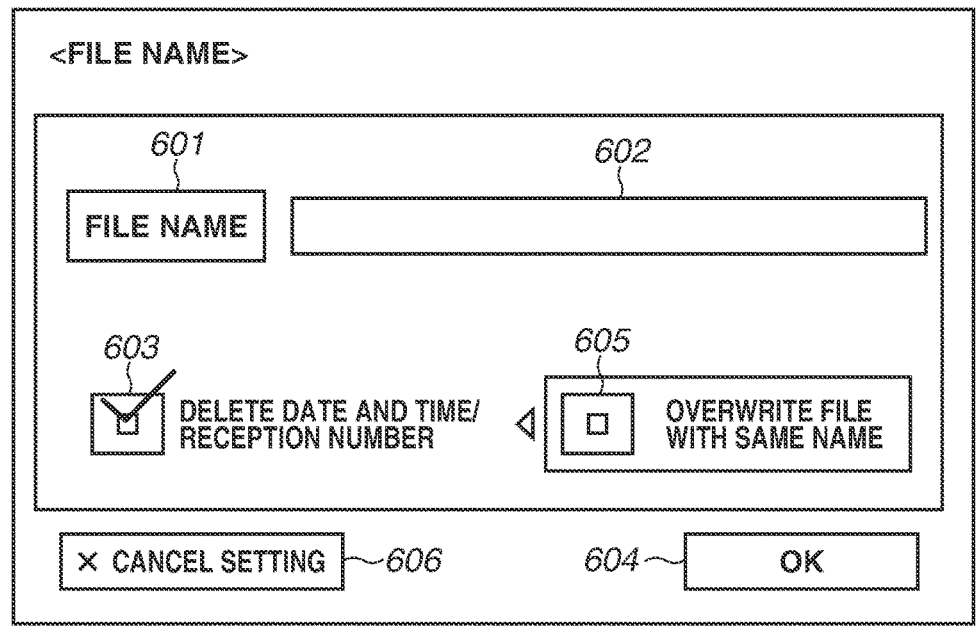

FIG. 6B illustrates an example of a screen in which the deletion specification box 603 is checked by a user.

An overwriting specification box 605 which is not displayed when the deletion specification box 603 is unchecked is displayed on the screen. The overwriting specification box 605 is a check box for selecting, in the case that a different file having the same file name as a file to be transmitted is already stored in the file transmission destination, whether to store the file to be transmitted by overwriting the relevant different file therewith. When the overwriting specification box 605 is checked in the case that a different file having the same file name as a file to be transmitted is already stored in the file transmission destination, the file to be transmitted is stored by overwriting the relevant different file therewith. On the other hand, when the overwriting specification box 605 is unchecked in the case that a different file having the same file name as a file to be transmitted is already stored in the file transmission destination, the file to be transmitted is stored without overwriting the relevant different file therewith. When the file is not overwritten, a file name which does not overlap with that of the already stored file is set and stored in a folder in the transmission destination.

The overwriting specification box 605 according to the present exemplary embodiment is displayed when the deletion specification box 603 is checked and not displayed when the deletion specification box 603 is unchecked.

It is because when the deletion specification box 603 is checked, the additional information is not added to the file name to be set to the file. Thus, there is a possibility that the file already stored in the file transmission destination has the same file name as the file to be transmitted. In such a case, the overwriting specification box 605 is displayed to cause a user to confirm and select whether to permit or prohibit overwriting, and accordingly, the file can be prevented from being overwritten without a user's intention.

On the other hand, when the deletion specification box 603 is unchecked, the additional information is added to the file name to be set to the file so as to avoid duplication of the file name. Thus, there is a bare possibility that the file already stored in the file transmission destination has the same file name as the file to be transmitted. If the overwriting specification box 605 is displayed to cause a user to confirm and select whether to permit or prohibit overwriting even in such a case, it may impose a load on a user.

Figure 7:
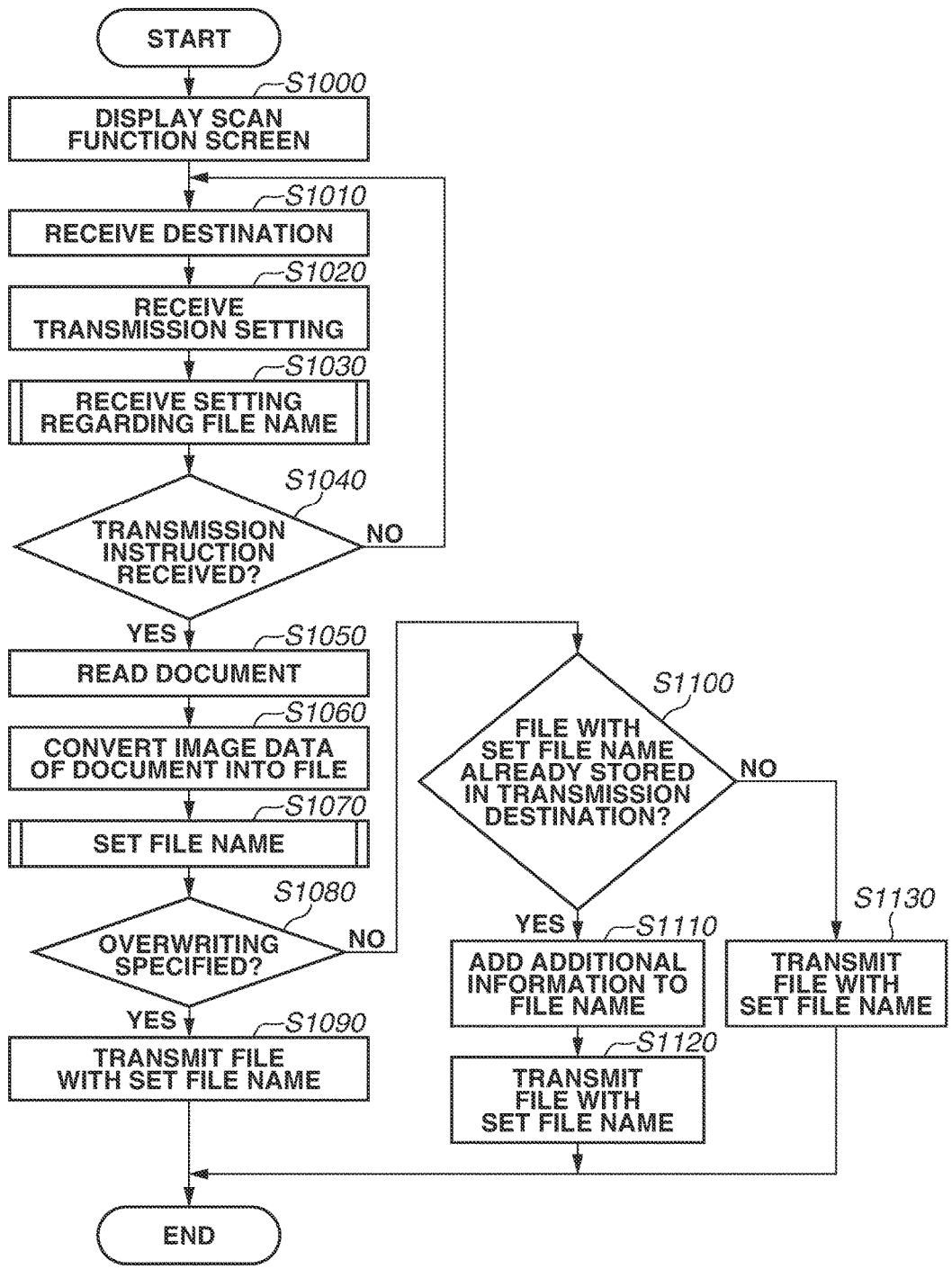
FIG. 7 is a flowchart illustrating operations of the MFP according to the exemplary embodiment of the present disclosure.

FIG. 7 is a flowchart illustrating operations of the MFP 100 according to the present exemplary embodiment when reading a document using the scanning function, converting image data of the read document into a file, and transmitting the converted file. Each step in the flowchart in FIG. 7 is executed by the CPU 101 reading a program stored in the ROM 102 to the RAM 103 and executing the program.

The processing illustrated in the flowchart in FIG. 7 is started in response that the "scan" button 407 is selected in the screen illustrated in FIG. 4.

In step S1000, the CPU 101 displays the screen illustrated in FIG. 5 on the operation unit 116.

In step S1010, the CPU 101 receives an address via the screen illustrated in FIG. 5. The address is input by a user operating the address book button 504, the one-touch button 505, or the new address button 506. The CPU 101 stores the received address as a transmission destination in the HDD 104.

In step S1020, the CPU 101 receives a transmission setting via the screen illustrated in FIG. 5. The transmission setting includes a resolution setting by the resolution setting button 507, a reading mode setting by the color button 508, and a size setting of a document to be read by the reading size setting button 509. The transmission setting further includes a file format setting of a file to be transmitted by the file format setting button 510. The CPU 101 stores the received setting in the HDD 104.

Figure 8:
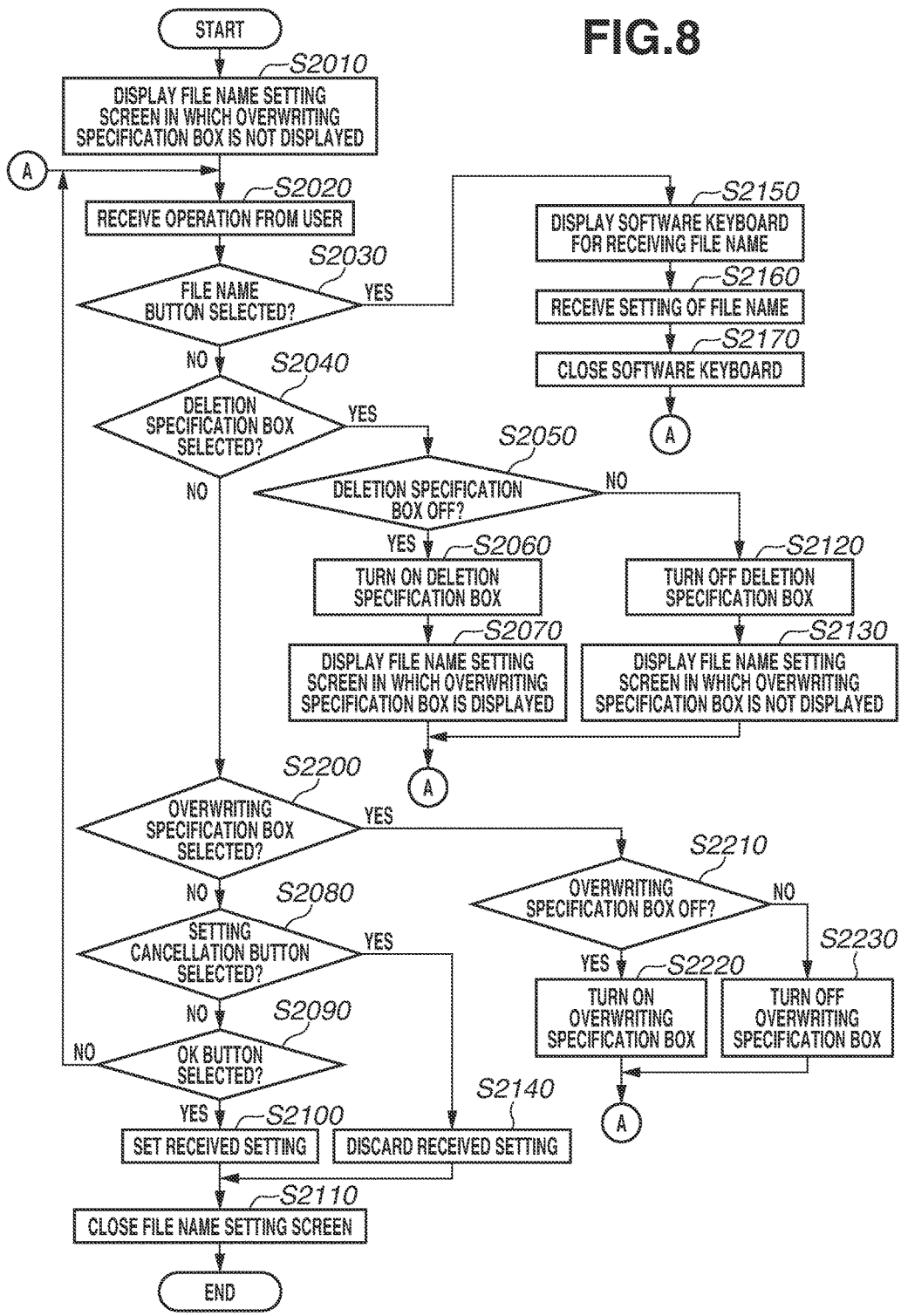
FIG. 8 is a flowchart illustrating operations of the MFP according to the exemplary embodiment of the present disclosure.

In step S1030, the CPU 101 receives a setting regarding a file name. The processing in step S1030 is described in detail with reference to FIG. 8. Each step in the flowchart in FIG. 8 is executed by the CPU 101 reading a program stored in the ROM 102 to the RAM 103 and executing the program.

In step S2010, the CPU 101 displays the file name setting screen illustrated in FIG. 6A in which the overwriting specification box 605 is not displayed on the operation unit 116.

In step S2020, the CPU 101 receives an operation from a user via the file name setting screen. In step S2030, the CPU 101 determines whether a file name button 601 is selected. When it is not determined that the file name button 601 is selected (NO in step S2030), the CPU 101 advances the processing to step S2040, whereas when it is determined that the file name button 601 is selected (YES in step S2030), the CPU 101 advances the processing to step S2150.

In step S2150, the CPU 101 displays the software keyboard on the operation unit 116 to receive the file name from the user. In step S2160, the CPU 101 receives the file name via the displayed software keyboard and advances the processing to step S2170. The file name received in step S2160 is stored in the HDD 104 by the CPU 101. When reception is completed, in step S2170, the CPU 101 terminates display of the software keyboard and advances the processing to step S2020.

In step S2040, the CPU 101 determines whether the deletion specification box 603 is selected. When it is determined that the deletion specification box 603 is selected (YES in step S2040), the CPU 101 advances the processing to step S2050, whereas when it is not determined that the deletion specification box 603 is selected (NO in step S2040), the CPU 101 advances the processing to step S2200.

In step S2050, the CPU 101 determines whether the deletion specification box 603 has been OFF before the operation in step S2020 is received. When it is determined that the deletion specification box 603 has been OFF before the operation in step S2020 is received (YES in step S2050), the CPU 101 advances the processing to step S2060. On the other hand, when it is determined that the deletion specification box 603 has been ON before the operation in step S2020 is received (NO in step S2050), the CPU 101 advances the processing to step S2120.

In step S2060, the CPU 101 changes a value of the deletion specification of the additional information stored in the HDD 104 from disabled to enabled. In addition, the CPU 101 changes display of the deletion specification box 603 from an unchecked state to a checked state.

In step S2070, the CPU 101 displays the file name setting screen in which the overwriting specification box 605 is displayed. The file name setting screen updated by the processing in steps S2060 and S2070 is illustrated in FIG. 6B. Subsequently, the CPU 101 advances the processing to step S2020.

When the processing is advanced from step S2050 to step S2120, the CPU 101 changes the value of the deletion specification of the additional information stored in the HDD 104 from enabled to disabled. In addition, the CPU 101 changes the display of the deletion specification box 603 from the checked state to the unchecked state.

In step S2130, the CPU 101 displays the file name setting screen in which the overwriting specification box 605 is not displayed. The file name setting screen updated by the processing in steps S2120 and S2130 is illustrated in FIG. 6A. Subsequently, the CPU 101 advances the processing to step S2020.

When the processing is advanced from step S2040 to step S2200, the CPU 101 determines whether the overwriting specification box 605 is selected. When it is determined that the overwriting specification box 605 is selected (YES in step S2200), the CPU 101 advances the processing to step S2210. On the other hand, when it is determined that the overwriting specification box 605 is not selected (NO in step S2200), the CPU 101 advances the processing to step S2080.

In step S2210, the CPU 101 determines whether the overwriting specification box 605 has been OFF before the operation in step S2020 is received. When it is determined that the overwriting specification box 605 has been OFF (YES in step S2210), the CPU 101 advances the processing to step S2220, whereas when it is determined that the overwriting specification box 605 has been ON (NO in step S2210), the CPU 101 advances the processing to step S2230.

In step S2220, the CPU 101 changes the value of the deletion specification stored in the HDD 104 from disabled to enabled. In addition, the CPU 101 changes the display of the overwriting specification box 605 from the unchecked state to the checked state.

In step S2230, the CPU 101 changes the value of the deletion specification stored in the HDD 104 from enabled to disabled. In addition, the CPU 101 changes the display of the overwriting specification box 605 from the checked state to the unchecked state.

In step S2080, the CPU 101 determines whether a setting cancellation button 606 is selected. When it is determined that the setting cancellation button 606 is selected (YES in step S2080), the CPU 101 advances the processing to step S2140, whereas when it is not determined that the setting cancellation button 606 is selected (NO in step S2080), the CPU 101 advances the processing to step S2090. In step S2140, the CPU 101 discards the setting received from the user during the processing illustrated in the flowchart in FIG. 8 and advances the processing to step S2110.

In step S2090, the CPU 101 determines whether an OK button 604 is selected. When it is determined that the OK button 604 is selected (YES in step S2090), the CPU 101 advances the processing to step S2100, whereas when it is determined that the OK button 604 is not selected (NO in step S2090), the CPU 101 advances the processing to step S2020.

When the processing is advanced to step S2100, the CPU 101 determines the setting received from the user during the processing illustrated in the flowchart in FIG. 8 and advances the processing to step S2110.

In step S2110, the CPU 101 closes the file name setting screen, terminates the processing illustrated in the flowchart in FIG. 8, and advances the processing to step S1040 in FIG. 7.

The description is returned to the flowchart in FIG. 7.

In step S1040, the CPU 101 determines whether a transmission instruction is received via the start key 403 illustrated in FIG. 4. When it is determined that the transmission instruction is received (YES in step S1040), the CPU 101 advances the processing to step S1050, whereas when it is determined that the transmission instruction is not received (NO in step S1040), the CPU 101 advances the processing to step S1010.

In step S1050, the CPU 101 issues a scanning instruction to the scanner 117 according to the transmission setting received in step S1020 and causes the scanner 117 to read a document. When the document is set in the ADF, the scanner 117 reads the document set in the ADF, whereas when the document is set on the document platen, the scanner 117 reads the document placed on the document platen. The scanner 117 generates the image data representing the image of the read document and transfers the image data to the CPU 101. The CPU 101 stores the transferred image data in the HDD 104.

In step S1060, the CPU 101 converts the image data stored in the HDD 104 into a file in the file format set by the file format setting button 510 in step S1020.

In step S1070, the CPU 101 sets a file name to the file converted in step S1060 according to a file name setting method set in step S1030.

The processing in step S1070 is described in detail with reference to FIG. 9.

Figure 9:
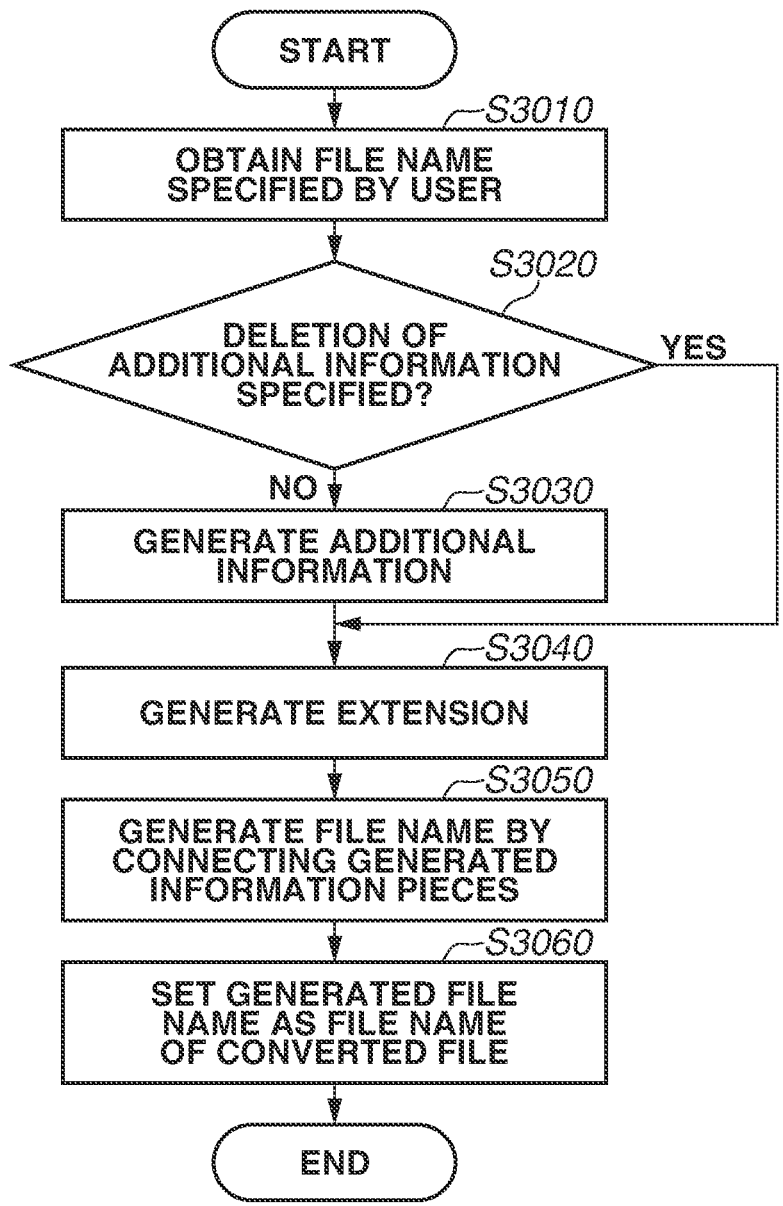
FIG. 9 is a flowchart illustrating operations of the MFP according to the exemplary embodiment of the present disclosure.

Each step in the flowchart in FIG. 9 is executed by the CPU 101 reading a program stored in the ROM 102 to the RAM 103 and executing the program.

In step S3010, the CPU 101 obtains the file name received in step S2160 from the HDD 104 and stores it in the RAM 103.

In step S3020, the CPU 101 determines whether deletion of the additional information is specified by the deletion specification box 603. When it is determined that the deletion of the additional information is not specified (NO in step S3020), the CPU 101 advances the processing to step S3030. When it is determined that the deletion of the additional information is specified (YES in step S3020), the CPU 101 advances the processing to step S3040.

In step S3030, the CPU 101 generates the additional information such as the date and time and the receipt number.

In step S3040, the CPU 101 generates an extension corresponding to the file format set by the file format setting button 510. When the file format is a PDF format, the extension will be ".PDF", and when the file format is a Joint Photographic Experts Group (JPEG) format, the extension will be ".JPG".

In step S3050, the CPU 101 generates the file name by connecting the file name obtained in step S3010, the additional information generated in step S3030, and the extension generated in step S3040 together. An underscore is inserted between the file name obtained in step S3010 and the additional information generated in step S3030.

In step S3060, the CPU 101 sets the generated file name as a file name of the file converted in step S1060.

Subsequently, the CPU 101 advances the processing to step S1080 in FIG. 7.

In step S1080, the CPU 101 determines whether the overwriting specification stored in the HDD 104 is enabled by the overwriting specification box 605. When it is determined that the overwriting specification is enabled (YES in step S1080), the CPU 101 advances the processing to step S1090, whereas when it is determined that the overwriting specification is not enabled (NO in step S1080), the CPU 101 advances the processing to step S1100.

In step S1090, the CPU 101 transmits the file with the file name set in step S1070 as it is to the transmission destination indicated by the address received in step S1010. In this regard, if a different file having the same file name as the file transmitted in step S1070 is already stored in the transmission destination, the relevant different file is overwritten with the file transmitted in step S1070.

In step S1100, the CPU 101 determines whether the different file having the file name same as the file name set in step S1070 is already stored in the transmission destination indicated by the address received in step S1010. When it is determined that the different file is already stored (YES in step S1100), the CPU 101 advances the processing to step S1110, whereas when it is determined that the different file is not already stored (NO in step S1100), the CPU 101 advances the processing to step S1130.

In step S1110, the CPU 101 adds the additional information to the file name. The additional information is generated using the same method described in step S3030 in FIG. 9 and added immediately before the extension in the file name. In step S1120, the CPU101 transmits the file with the file name to which the additional information is added.

In step S1130, the CPU 101 transmits the file with the file name set in step S1070 as it is to the transmission destination indicated by the address received in step S1010.

According to the present exemplary embodiment, the overwriting specification button for selecting whether to perform overwriting in the case that a duplicate file exists in the transmission destination is displayed only when a user specifies to delete the additional information of the transmission file name.

Accordingly, it is not necessary to confirm with a user whether to select the overwriting specification button even when it is less likely to be overwritten, and the operability can be improved.

According to the present exemplary embodiment, the example is described in which the overwriting specification box 605 is displayed or not displayed according to the selection state of the deletion specification box 603. However, the present disclosure is not limited to the above-described example. For example, the same effect can be obtained using hatching instead of non-display, and the overwriting specification box 605 may be displayed with or without using hatching according to the selection state of the deletion specification box 603.

According to the present exemplary embodiment, the example is described in which the additional information is automatically added to the file name when the deletion specification box 603 is unchecked, and the additional information is not added to the file name when the deletion specification box 603 is checked. However, the present disclosure is not limited to this example. An addition specification box may be provided, and the additional information may be added to the file name when the addition specification box is checked, and the additional information may not be added to the file name when the addition specification box is unchecked.

According to the first exemplary embodiment, the example is described in which whether to display the overwriting specification box 605 or not is determined according to the selection state of the deletion specification box 603.

According to a second exemplary embodiment, an example will be described in which whether to display the overwriting specification box 605 or not is determined based on a content of a file name set by a user.

The MFP 100 according to the second exemplary embodiment has a function of, when a specific character string (a replacement character string) is received as a file name, replacing the specific character string with corresponding information and generating a file name.

For example, when % DEVNAME % is received as the specific character string, and transmission is specified, the CPU 101 replaces % DEVNAME % with a device name of its own apparatus and generates the file name. The device name of its own apparatus is, for example, a color apparatus No. 1, a color apparatus No. 2, or the like.

Further, when % DATE % is received as the specific character string, and transmission is specified, the CPU 101 replaces % DATE % with the date obtained from the timer 106 and generates the file name.

Further, when % TIME % is received as the specific character string, and transmission is specified, the CPU 101 replaces % TIME % with hour, minute, and second obtained from the timer 106 and generates the file name.

When both of % DATE % and % TIME % are included as the character strings of the file, it is less likely that the generated file name overlaps with the file name of the file already stored in the transmission destination. On the other hand, when either of % DATE % or % TIME % is not included as the character string of the file, it is highly likely that the generated file name overlaps with the file name of the file already stored in the transmission destination.

Thus, according to the second exemplary embodiment, the example is described in which a character string set as the file name is analyzed and whether to display the overwriting specification box 605 is determined according to whether % DATE % and % TIME % are included or not.

The contents described with reference to FIGS. 1 to 5 are similar to the first exemplary embodiment, and differences are described.

Figure 10A:
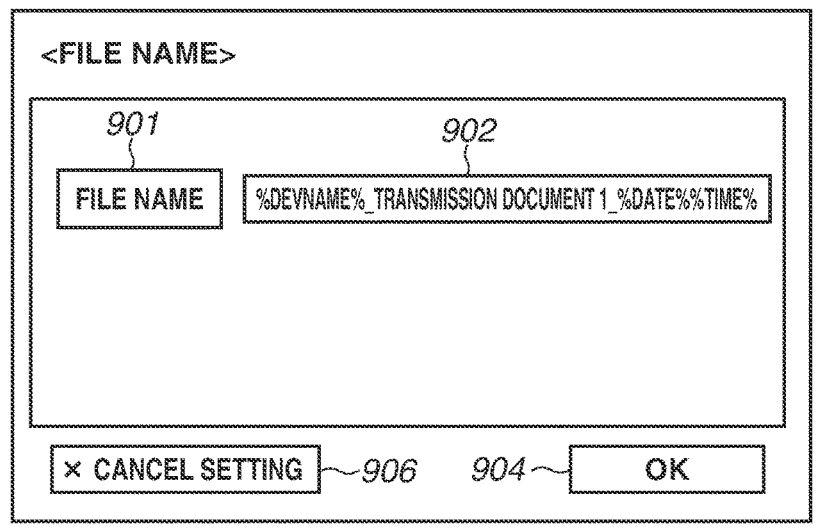
FIGS. 10A to 10C illustrate operation screens displayed on the operation unit according to the exemplary embodiment of the present disclosure.
Figure 10B:
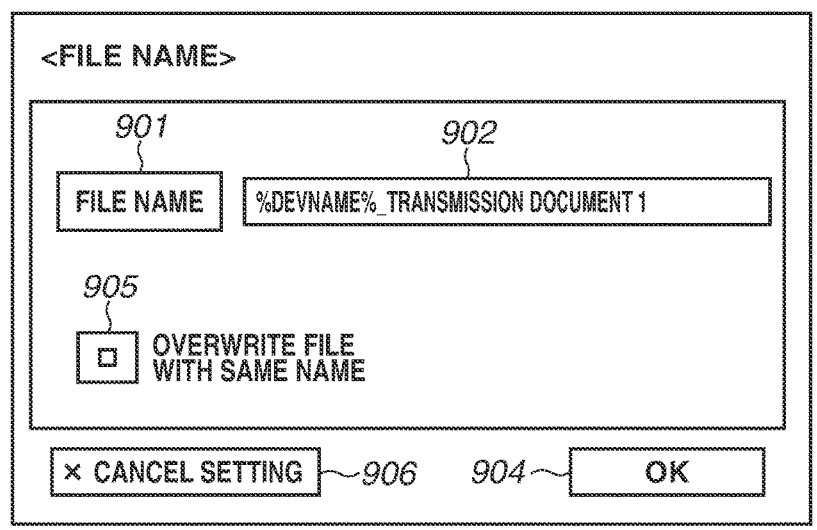

FIGS. 10A and 10B respectively illustrates the file name setting screens displayed instead of those in FIGS. 6A and 6B.

A "file name" button 901 in FIG. 10A is a button for displaying the software keyboard for receiving a file name set to a file from a user. When the "file name" button 901 is pressed, the software keyboard is displayed. The user sets a file name using the software keyboard. The set file name is stored in the HDD 104 by the CPU 101. Further, the set file name is displayed in a file name display field 902.

In the example in FIG. 10A, "% DEVNAME %_transmission document 1_% DATE % % TIME %" is input as the file name by a user and displayed in the file name display field 902.

Figure 10C:
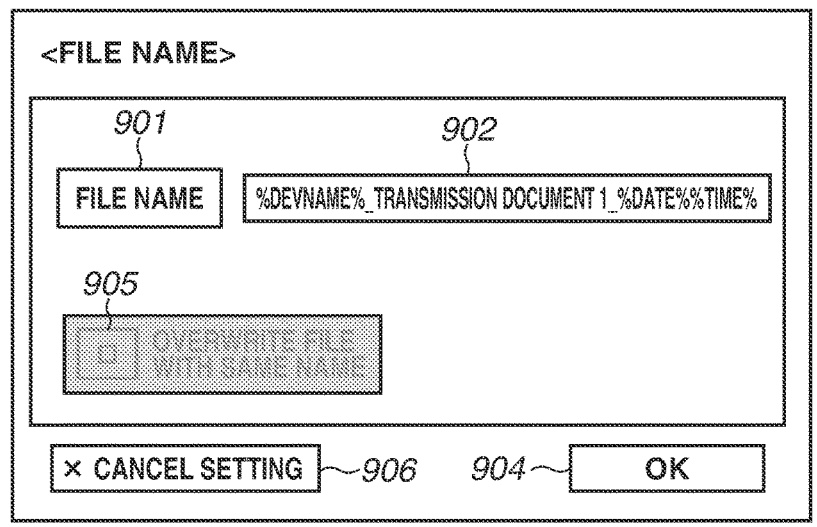

The file name includes both of % DATE % and % TIME %, an overwriting specification button 905 as illustrated in FIG. 10B is not displayed. In this regard, the overwriting specification button 905 may be displayed using hatching as illustrated in FIG. 10C instead of non-display.

In the example in FIG. 10B, "% DEVNAME %_transmission document 1" is input as the file name by a user and displayed in the file name display field 902.

The file name does not include either % DATE % or % TIME %, the overwriting specification button 905 is displayed so that a user can select.

Figure 11:
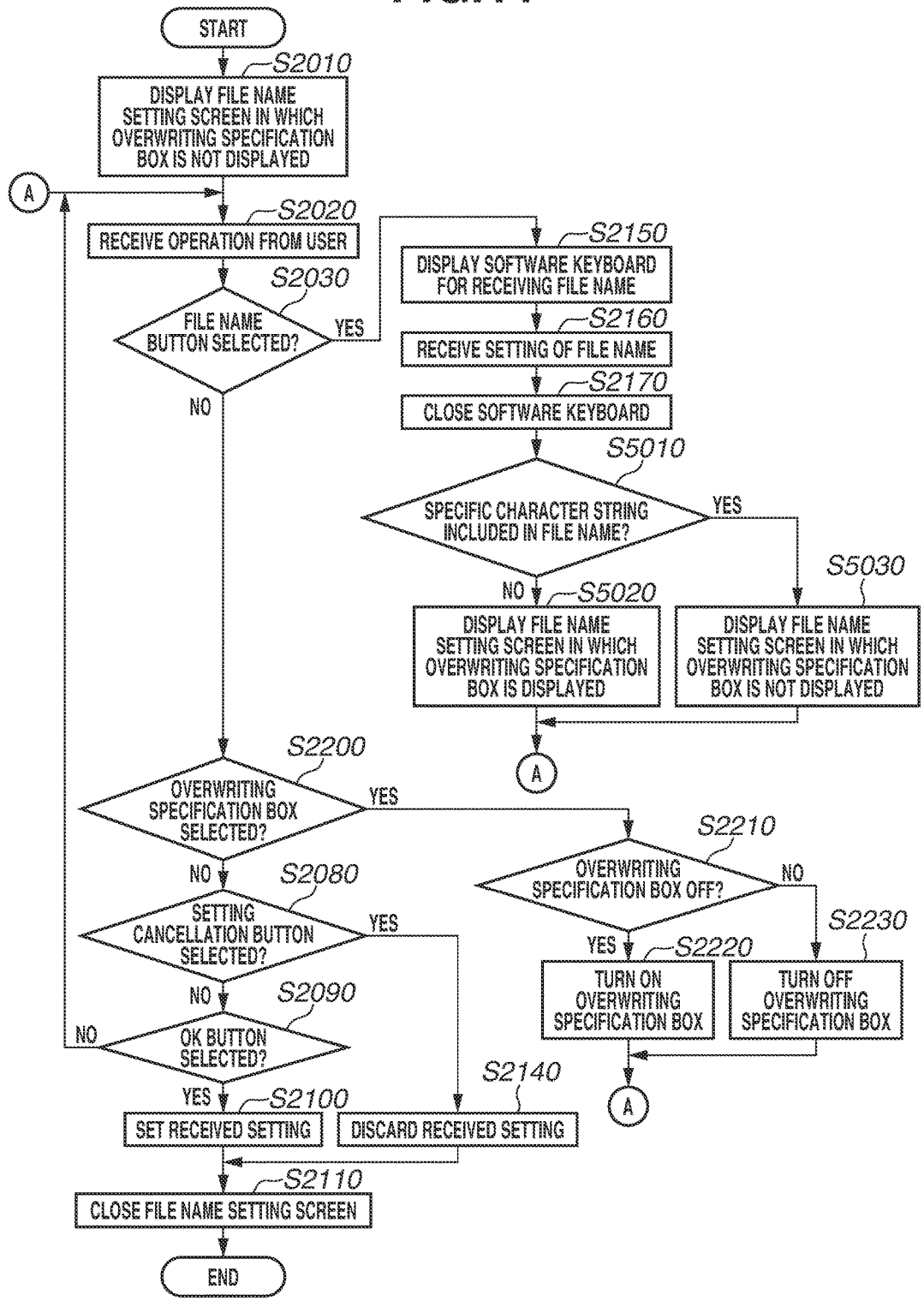
FIG. 11 is a flowchart illustrating operations of the MFP according to the exemplary embodiment of the present disclosure.

FIG. 11 is a flowchart illustrating operations of the MFP 100 according to the present exemplary embodiment when reading a document using the scanning function, converting image data of the read document into a file, and transmitting the converted file. Each step in the flowchart in FIG. 11 is executed by the CPU 101 reading a program stored in the ROM 102 to the RAM 103 and executing the program. The step similar to that in FIG. 8 is denoted by the same step number.

A difference from FIG. 8 is described. In FIG. 11, step S2040 for determining whether the deletion specification box 603 is selected is not included. In step S2030, when it is not determined that the file name is selected (NO in step S2030), the CPU 101 advances the processing to step S2200.

Further, another difference is described.

In FIG. 11, after closing the software keyboard in step S2170, the CPU 101 advances the processing to step S5010.

In step S5010, the CPU 101 determines whether the file name received in step S2160 includes the specific character string. More specifically, the CPU 101 determines whether the file name received in step S2160 includes both of % DATE % and % TIME %. When it is determined that both of % DATE % and % TIME % are included (YES in step S5010), the CPU 101 advances the processing to step S5030, whereas when it is determined that either one of % DATE % or % TIME % is not included (NO in step S5010), the CPU 101 advances the processing to step S5020.

In step S5030, the CPU 101 displays the file name setting screen in which the overwriting specification button 905 is not displayed on the operation unit 116. FIG. 10A illustrates the display example of the file name setting screen in this case. The display example in FIG. 10C in which the overwriting specification button 905 is displayed using hatching may be displayed instead of that in FIG. 10A.

In step S5020, the CPU 101 displays the file name setting screen in which the overwriting specification button 905 is displayed on the operation unit 116. FIG. 10B illustrates the display example of the file name setting screen in this case.

As described above, according to the second exemplary embodiment, whether to display the overwriting specification box 905 is determined based on whether the specific character string is included in the file name set by the user.

Accordingly, it is not necessary to confirm with a user whether to select the overwriting specification button even when the file name set by the user includes the specific character string (a replacement character string) and it is less likely to be overwritten, and the operability can be improved.

According to a third exemplary embodiment, an example is described in which a meaningful combination of a setting whether to add the additional information to the file name and specification of whether to permit or prohibit overwriting is displayed in advance as an option so as to cause a user to select the option.

Figure 12:
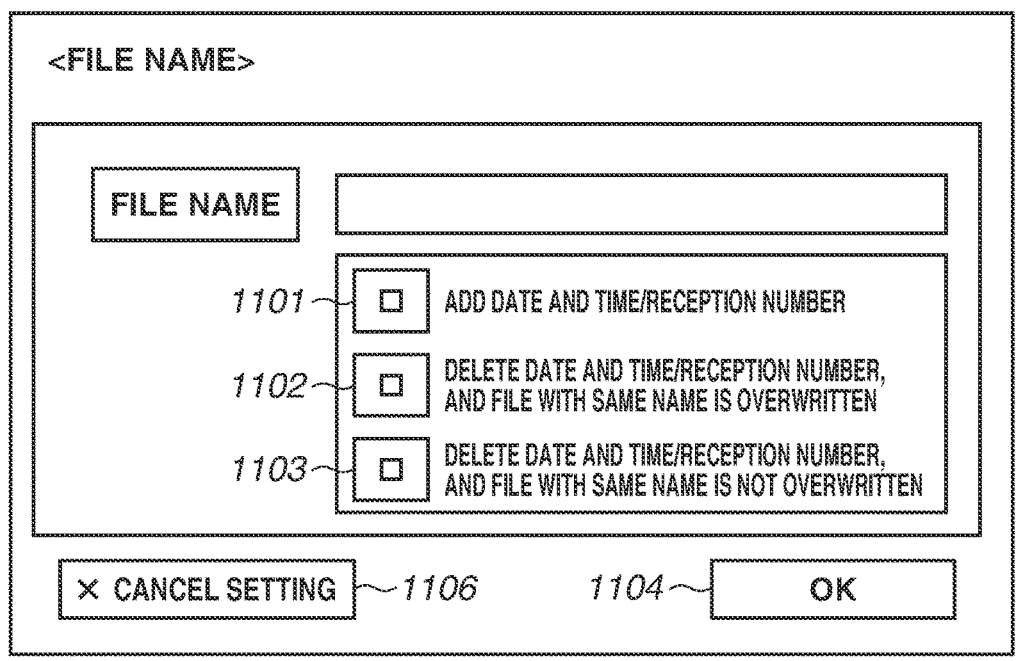
FIG. 12 illustrates an operation screen displayed on the operation unit according to the exemplary embodiment of the present disclosure.

FIG. 12 illustrates the file name setting screen according to the present exemplary embodiment.

The file name setting screen in FIG. 12 includes three options.

The first option is to add the additional information such as the date and time and the receipt number to the file name. The first option can be selected via a check box 1101.

The second option is to delete the additional information and overwrite a different file having the same file name. The second option can be selected via a check box 1102.

The third option is to delete the additional information and not to overwrite a different file having the same file name. The third option can be selected via a check box 1103.

A user selects any one of these three options.

FIG. 13 is a flowchart illustrating operations of the MFP 100 according to the present exemplary embodiment when reading a document using the scanning function, converting image data of the read document into a file, and transmitting the converted file. Each step in the flowchart in FIG. 13 is executed by the CPU 101 reading a program stored in the ROM 102 to the RAM 103 and executing the program. The step similar to that in FIG. 8 is denoted by the same step number.

A difference from FIG. 8 is described. In FIG. 13, in step S2030, when it is not determined that the file name is selected (NO in step S2030), the CPU 101 advances the processing to step S6010.

In step S6010, the CPU 101 determines whether the check box 1101 is selected by a user. When it is determined that the check box 1101 is selected by the user (YES in step S6010), the CPU 101 advances the processing to step S6040. On the other hand, when it is not determined that the check box 1101 is selected by the user (NO in step S6010), the CPU 101 advances the processing to step S6020.

In step S6040, the CPU 101 disables the specification of deletion of the additional information. In step S6050, the CPU 101 disables the overwriting specification. Subsequently, the CPU 101 advances the processing to step S2020.

When the processing is advanced from step S6010 to step S6020, in step S6020, the CPU 101 determines whether the check box 1102 is selected by the user. When it is determined that the check box 1102 is selected by the user (YES in step S6020), the CPU 101 advances the processing to step S6060. On the other hand, when it is not determined that the check box 1102 is selected by the user (NO in step S6020), the CPU 101 advances the processing to step S6030.

In step S6060, the CPU 101 enables the specification of deletion of the additional information. In step S6070, the CPU 101 enables the overwriting specification. Subsequently, the CPU 101 advances the processing to step S2020.

In step S6030, the CPU 101 determines whether the check box 1103 is selected by the user. When it is determined that the check box 1103 is selected by the user (YES in step S6030), the CPU 101 advances the processing to step S6080. On the other hand, when it is not determined that the check box 1103 is selected by the user (NO in step S6030), the CPU 101 advances the processing to step S2080.

In step S6080, the CPU 101 enables the specification of deletion of the additional information. In step S6090, the CPU 101 disables the overwriting specification. Subsequently, the CPU 101 advances the processing to step S2020.

Subsequently, if the specification of deletion of the additional information is disabled when the processing in FIG. 9 is executed, it is determined NO in step S3020, and the processing in step S3030 is executed, so that the additional information is generated. Accordingly, the CPU 101 performs the control to add the additional information to the file name.

On the other hand, if the specification of deletion of the additional information is enabled when the processing in FIG. 9 is executed, the processing in step S3040 is executed by being advanced from step S3020 without executing the processing in step S3030. Accordingly, the CPU 101 performs the control not to set the additional information to the file name.

Further, when the overwriting specification is enabled, it is determined YES in step S1080, and, in step S1090, when a different file having the same file name exists in the file transmission destination, the transmitted file is stored by overwriting the different file therewith.

On the other hand, when the overwriting specification is not enabled, it is determined NO in step S1080, and the processing described in steps S1100 to step S1130 is executed. Accordingly, when a different file having the same file name exists in the file transmission destination, the additional information is set to the file name of the file to be transmitted so as to prevent the different file from being overwritten with the file to be transmitted and stored.

As described above, according to the third exemplary embodiment, a meaningful combination of the setting whether to add the additional information to the file name and the specification of whether to permit or prohibit overwriting can be displayed in advance as an option so as to cause a user to select the option.

According to the present exemplary embodiment, the example is described in which the three options are displayed by the check boxes side by side, however, these three options may be displayed as a pull-down.

Other Embodiments

According to the above-described exemplary embodiments, the examples are described in which additional information is added after a character string set by a user, however, the additional information may be added before the character string set by the user. Further, it may be configured to enable a user to select in advance whether to add the additional information after or before the character string set by the user.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-168295, filed Aug. 27, 2015, which is hereby incorporated by reference herein in its entirety.

What is claimed is:

1. A file transmission apparatus for transmitting a file, the file transmission apparatus comprising:
    a first reception unit configured to receive a user's selection of either including or not including additional information in a file name of the file to be transmitted;
    a setting unit configured to set a file name of the file to be transmitted in accordance with the selection received by the first reception unit; and
    a second reception unit configured to receive a user's selection of, in a case that a file having a same file name as the file name set by the setting unit is stored in a transmission destination of the file to be transmitted, either overwriting or not overwriting the file stored in the transmission destination with the file to be transmitted,
    wherein, in accordance with the first reception unit receiving a user's selection of not including the additional information, the second reception unit is enabled to receive the user's selection of either overwriting or not overwriting the file stored in the transmission destination with the file to be transmitted.

2. The file transmission apparatus according to claim 1, wherein in accordance with the first reception unit receiving a user's selection of including the additional information, the second reception unit does not receive the user's selection of either overwriting or not overwriting the file stored in the transmission destination with the file to be transmitted.

3. The file transmission apparatus according to claim 2, comprising a display unit configured to display an operation screen,
    wherein the second reception unit is capable of receiving the user's selection by a key displayed on the operation screen, and
    the display unit does not display the key on the operation screen in accordance with the first reception unit receiving a user's selection of including the additional information.

4. The file transmission apparatus according to claim 2, further comprising a display unit configured to display an operation screen,
    wherein the second reception unit is capable of receiving the user's selection by a key displayed on the operation screen, and
    the key is controlled so as not to be selected in accordance with the first reception unit receiving a user's selection of including the additional information.

5. The file transmission apparatus according to claim 1, wherein, in a case that the first reception unit receives a user's selection of not including the additional information, the second reception unit receives a user's selection of not performing the overwriting, and that a file having the same file name as the file name set by the setting unit is stored in the transmission destination, the setting unit sets a file name including the additional information even if the first reception unit receives a user's selection of not including the additional information.

6. The file transmission apparatus according to claim 1, further comprising a display unit configured to display an operation screen,
    wherein the second reception unit is capable of receiving the user's selection by a key displayed on the operation screen, and
    the display unit displays the key on the operation screen in accordance with the first reception unit receiving a user's selection of not including the additional information.

7. The file transmission apparatus according to claim 5, further comprising a display unit configured to display an operation screen,
    wherein the second reception unit is capable of receiving the user's selection by a key displayed on the operation screen, and
    control is performed to enable the key to be selected in accordance with the first reception unit receiving a user's selection of not including the additional information.

8. The file transmission apparatus according to claim 1, further comprising:
    a transmission unit configured to transmit a file;
    a reading unit configured to read an image of a document; and
    a conversion unit configured to convert image data representing the image of the document read by the reading unit into a file,
    wherein the transmission unit transmits the file converted by the conversion unit.

9. The file transmission apparatus according to claim 1, wherein the additional information is information indicating a time or a serial number.

10. A method for controlling a file transmission apparatus for transmitting a file, the method comprising:
- receiving, as first reception, a user's selection of either including or not including additional information in a file name of the file to be transmitted;
- setting a file name of the file to be transmitted in accordance with the selection received in the first reception; and
- receiving, as second reception, a user's selection of, in a case that a file having a same file name as the file name set in the setting is stored in a transmission destination of the file to be transmitted, either overwriting or not overwriting the file stored in the transmission destination with the file to be transmitted,
- wherein, in accordance with a user's selection of not including the additional information is received in the first reception, the user's selection of either overwriting or not overwriting the file stored in the transmission destination with the file to be transmitted is enabled to be received in the second reception.

11. The file transmission apparatus according to claim 1, further comprising a third reception unit configured to receive a selection of the file name of the file to be transmitted,
- wherein, on the basis that the first reception unit receives a user's selection of including the additional information, the setting unit sets the file name received by the third reception unit, the additional information, and an extension indicating a file format, as a file name of the file to be transmitted, and
- on the basis that the first reception unit receives a user's selection of not including the additional information, the setting unit sets the file name received by the third reception unit and the extension as the file name of the file to be transmitted.

12. The file transmission apparatus according to claim 1, further comprising a display unit configured to display an operation screen,
- wherein the first reception unit is capable of receiving the user's selection by a key displayed on the operation screen.

13. The file transmission apparatus according to claim 12, wherein on the basis that the key is in a not selected state, the additional information is included in the file name, and on the basis that the key is in a selected state, the additional information is not included in the file name.

14. The file transmission apparatus according to claim 1, further comprising a transmission unit configured to transmit a file,
- wherein in a case that the first reception unit receives a user's selection of not including the additional information, and the second reception unit receives a user's selection of performing the overwriting, the transmission unit transmits a file, to which a file name not including the additional information is set, to the transmission destination as the file to be transmitted in a overwriteable manner.

15. The file transmission apparatus according to claim 1, further comprising a transmission unit configured to transmit a file,
- wherein in a case that the first reception unit receives a user's selection of not including the additional information, the second reception unit receives a user's selection of not performing the overwriting, and that a file having the same file name as the file name set by the setting unit is not stored in the transmission destination, the transmission unit transmits the file, to which a file name not including the additional information is set, as the file to be transmitted to the transmission destination.

16. The file transmission apparatus according to claim 1, further comprising:
- a reading unit configured to read an image of a document; and
- a conversion unit configured to convert image data representing the image of the document read by the reading unit.

17. A file transmission apparatus for transmitting a file, the file transmission apparatus comprising:
- a display unit capable of displaying a first key for selecting either including or not including additional information in a file name of a file to be transmitted and a second key for selecting, in a case that a file having a same file name as the file name of the file to be transmitted is stored in a transmission destination, either overwriting or not overwriting the file stored in the transmission destination with the file to be transmitted.

* * * * *